(12) United States Patent
Kang

(10) Patent No.: US 7,740,269 B2
(45) Date of Patent: Jun. 22, 2010

(54) VEHICULAR AIR BAG DOOR

(75) Inventor: Byung Young Kang, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 33 days.

(21) Appl. No.: 12/124,380

(22) Filed: May 21, 2008

(65) Prior Publication Data

US 2009/0134608 A1 May 28, 2009

(30) Foreign Application Priority Data

Nov. 28, 2007 (KR) ............ 10-2007-0122346

(51) Int. Cl.
*B60R 21/20* (2006.01)
*B60R 21/205* (2006.01)

(52) U.S. Cl. .................... 280/728.3; 280/732

(58) Field of Classification Search ........... 280/728.3, 280/732; B60R 21/20
See application file for complete search history.

(56) References Cited

U.S. PATENT DOCUMENTS

| | | | | |
|---|---|---|---|---|
| 6,467,801 B1 * | 10/2002 | Preisler et al. | ........... | 280/728.3 |
| 6,595,543 B2 * | 7/2003 | Desprez | ........... | 280/728.3 |
| 6,742,803 B2 * | 6/2004 | Ueno et al. | ........... | 280/728.3 |
| 6,872,349 B2 * | 3/2005 | Hier et al. | ........... | 264/328.7 |
| 7,007,970 B2 * | 3/2006 | Yasuda et al. | ........... | 280/728.3 |
| 7,093,849 B2 * | 8/2006 | Nishijima et al. | ........... | 280/728.3 |
| 7,100,942 B2 | 9/2006 | Park | | |
| 7,128,336 B2 | 10/2006 | Geum | | |
| 7,152,872 B2 * | 12/2006 | Fujii | ........... | 280/728.3 |
| 7,178,825 B2 * | 2/2007 | Fujii et al. | ........... | 280/728.3 |
| 7,234,724 B1 * | 6/2007 | Cowelchuk et al. | ........... | 280/728.2 |
| 7,422,232 B2 * | 9/2008 | Cowelchuk et al. | ........... | 280/728.3 |
| 2003/0230874 A1 | 12/2003 | Ahn et al. | | |
| 2005/0269804 A1 * | 12/2005 | Yamada et al. | ........... | 280/728.3 |
| 2006/0033313 A1 * | 2/2006 | Horiyama | ........... | 280/728.3 |
| 2007/0102903 A1 * | 5/2007 | Kong | ........... | 280/728.3 |
| 2008/0012273 A1 * | 1/2008 | Cowelchuk et al. | ........... | 280/728.3 |
| 2008/0030009 A1 * | 2/2008 | Hayashi | ........... | 280/728.3 |
| 2008/0136146 A1 * | 6/2008 | Kong | ........... | 280/728.3 |

FOREIGN PATENT DOCUMENTS

JP 10250519 A * 9/1998

* cited by examiner

*Primary Examiner*—Paul N. Dickson
*Assistant Examiner*—Joselynn Y. Sliteris
(74) *Attorney, Agent, or Firm*—Greenblum & Bernstein P.L.C.

(57) ABSTRACT

A vehicular air bag door is disclosed. More particularly, a vehicular air bag door for achieving a reduction in the number of constituent elements and a simplified manufacturing process thereof is disclosed. The vehicular air bag door includes a chute provided at an instrument panel to mount an air bag module thereon, a door plate provided in an opening of the chute and connected with a door section defined in the instrument panel, and a hinge provided between the chute and the door plate. The chute, the door plate, and the hinge are integrally formed with one another.

8 Claims, 4 Drawing Sheets

VEHICULAR AIR BAG DOOR

BACKGROUND OF THE INVENTION

1. Field of the Invention

The present invention relates to a vehicular air bag door, and more particularly, to a vehicular air bag door, which can achieve a reduction in the number of constituent elements and a simplified manufacturing process thereof.

2. Description of the Related Art

FIG. 1 is a perspective view illustrating a conventional vehicular instrument panel.

Referring to FIG. 1, conventionally, an air bag module is installed in a car, to protect a passenger as well as a driver upon a car collision. The air bag module is mounted inside a vehicular instrument panel. For this, the instrument panel has an incision formed at a portion thereof corresponding to a front passenger seat, to define a passenger-seat door section. The incision is formed by a laser scoring process or other various processes.

The shown conventional instrument panel 10 has the passenger-seat door section 20 defined at a portion thereof in front of a passenger seat. When an air bag, which is mounted inside the instrument panel 10 at a position corresponding to the passenger seat, is inflated through a chute (not shown) upon a car collision to stop the inertia movement of a passenger, the passenger-seat door section 20 assures the air bag to be easily discharged out of the instrument panel 10.

The boundary of the passenger-seat door section 20 is defined by the incision processed at an inner surface of the instrument panel 10. To prevent the incision from being seen from the outside, the incision takes the form of a laser score line. As the incision is cut, the passenger-seat door section 20 is opened by the air bag.

In the case of the above described conventional air bag door, a chute and a door plate are individually manufactured and mounted inside the passenger-seat door section of the instrument panel, and also, are connected with each other by use of hinge and fastening members. Therefore, the conventional air bag door has problems of a complicated manufacturing process and an increased number of constituent elements thereof.

SUMMARY OF THE INVENTION

Therefore, the present invention has been made in view of the above problem, and it is an object of the present invention to provide a vehicular air bag door, which can achieve a reduction in the number of constituent elements and a simplified manufacturing process thereof.

In accordance with the present invention, the above and other objects can be accomplished by the provision of a vehicular air bag door comprising: a chute provided at an instrument panel to mount an air bag module thereon; a door plate provided in an opening of the chute and connected with a door section defined in the instrument panel; and a hinge provided between the chute and the door plate, wherein the chute, the door plate, and the hinge are integrally formed with one another.

The chute may comprise: a first fixing portion integrally formed with the hinge and coupled with the instrument panel; and a second fixing portion integrally formed with the first fixing portion and coupled with the instrument panel, and the first fixing portion may be made of a soft material as compared to the second fixing portion.

The hinge may include wrinkles obtained by folding a member between the door plate and the first fixing portion by multiple times.

The door plate, the hinge, and the first fixing portion may be made of the same soft material as one another.

The chute may have first ribs to be fused to the instrument panel.

The door plate may have second ribs to be fused to the instrument panel.

The door plate may comprise: a first plate provided in a part of the opening defined in the chute; and a second plate provided in the remaining part of the opening defined in the chute.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
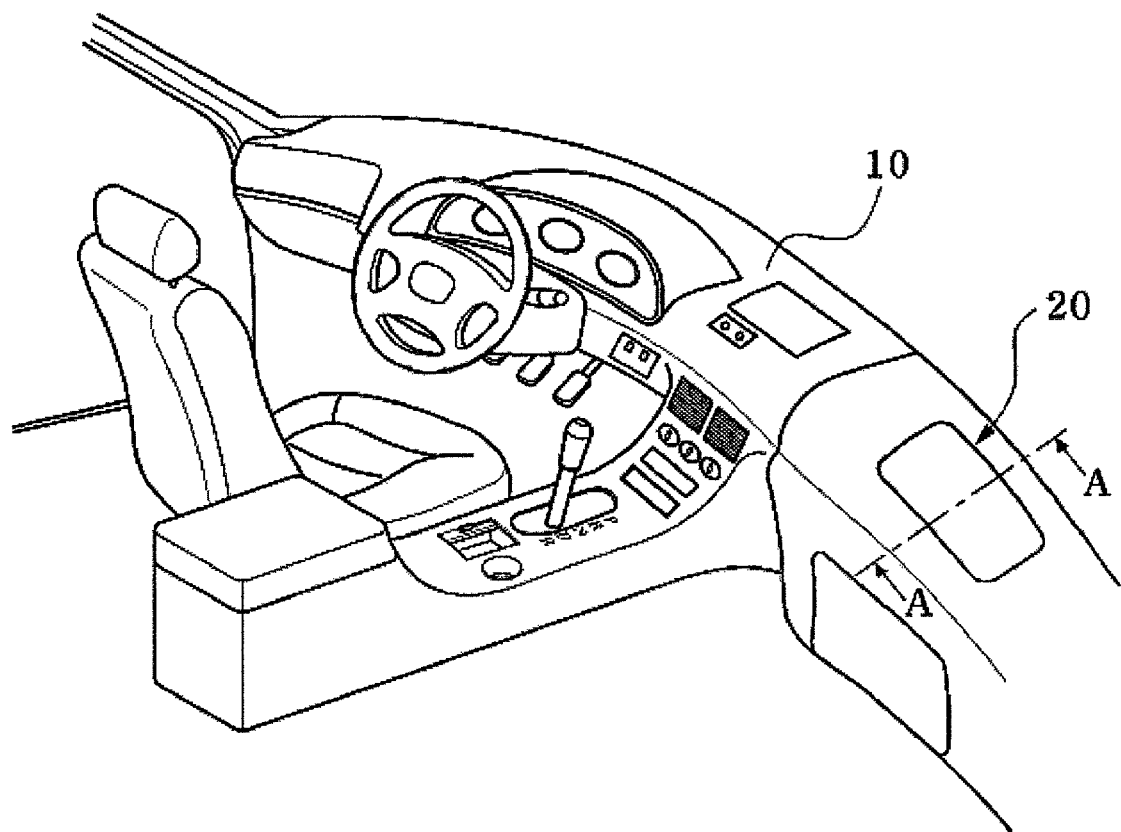
FIG. 1 is a perspective view illustrating a conventional vehicular instrument panel.

Now, preferred embodiments of a vehicular air bag door according to the present invention will be described with reference to the accompanying drawings.

Hereinafter, for the convenience of explanation, a vehicular air bag door for use in an automobile will be described by example.

In the drawings, the thickness of lines or the size of constituent elements may be exaggerated for the clear understanding and convenience of description.

Also, the terms used in the following description are terms defined taking into consideration the functions obtained in accordance with the present invention, and may be changed in accordance with the option of a user or operator or a usual practice.

Therefore, the definitions of these terms should be determined based on the whole content of this specification.

Meanwhile, for the convenience of description, elements having the same configuration and operation as those of the prior art are designated by the same reference numerals and names.

Figure 2:
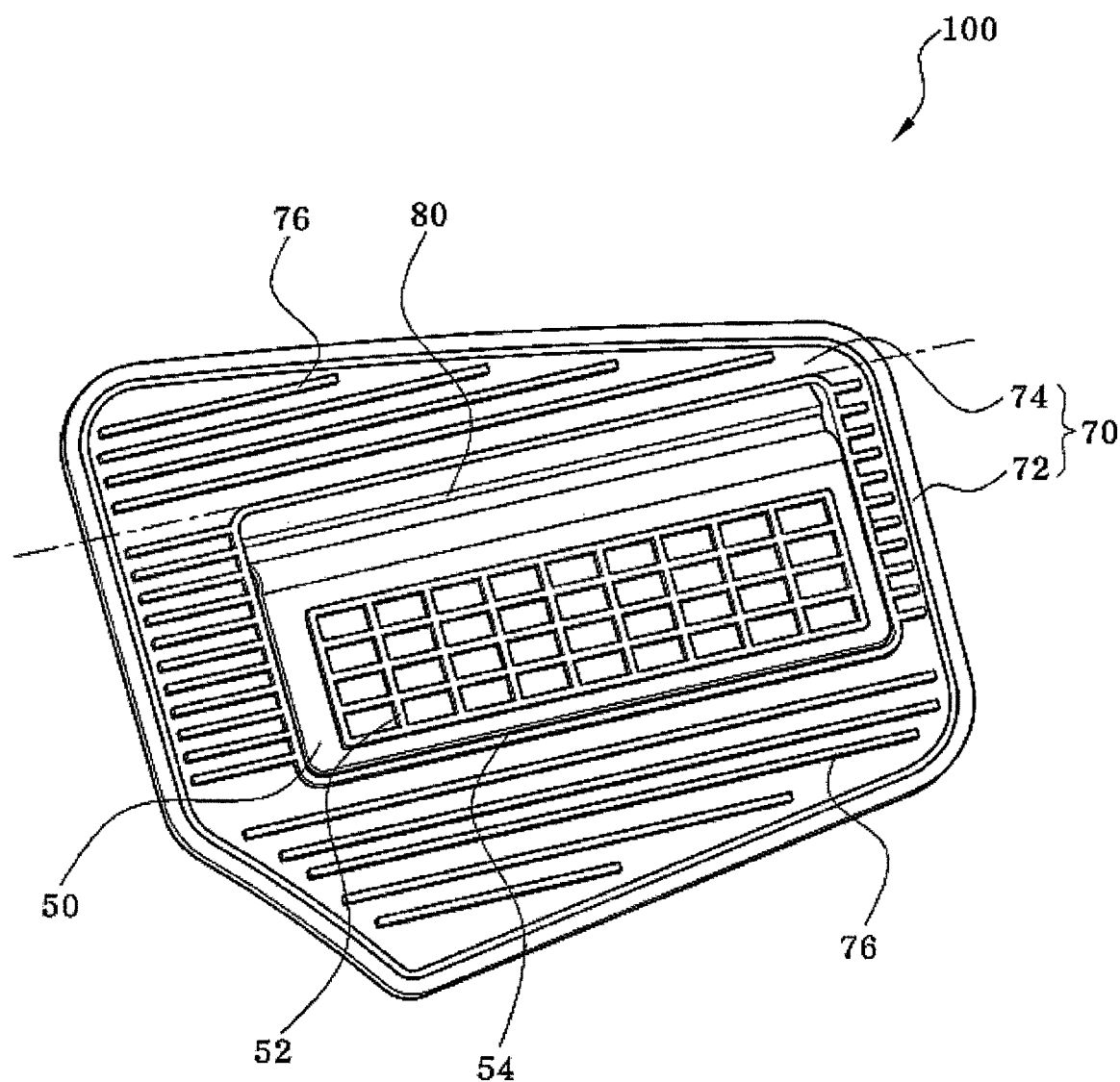
FIG. 2 is a perspective view illustrating a vehicular air bag door according to an embodiment of the present invention.
Figure 3:
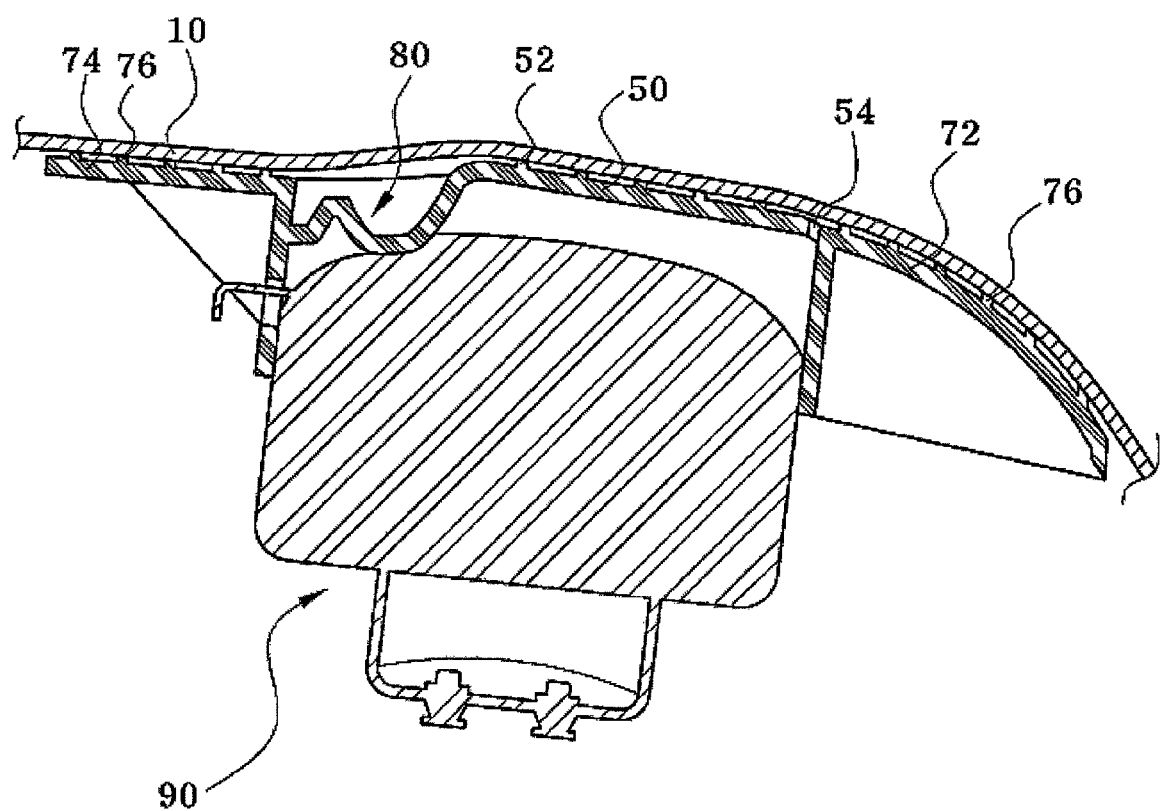
FIG. 3 is a sectional view of the vehicular air bag door shown in FIG. 2.

FIG. 2 is a perspective view illustrating a vehicular air bag door according to an embodiment of the present invention, and FIG. 3 is a sectional view of the vehicular air bag door shown in FIG. 2.

Referring to FIGS. 2 and 3, the vehicular air bag door according to the embodiment of the present invention, which is designated as reference numeral 100, includes a chute 70 provided at an instrument panel 10 to mount an air bag module 90 thereon, a door plate 50 provided at an opening defined in the chute 70 and connected with a door section 20 of the instrument panel 10, and a hinge 80 provided between the chute 70 and the door plate 50.

The chute 70, door plate 50, and hinge 80 are integrally formed with one another.

Accordingly, the air-bag door 100 can be manufactured by a single process for forming the chute 70, door plate 50, and hinge 80 by use of a single mold, rather than forming the chute 70, door plate 50, and hinge 80 individually.

More specifically, the chute 70 includes a first fixing portion 74 integrally formed with the hinge 80 and coupled with the instrument panel 10, and a second fixing portion 72 integrally formed with the first fixing portion 74 and coupled with the instrument panel 10. As compared to the second fixing portion 72, the first fixing portion 74 is made of a soft material. Further, an incision 54 may be provided between the door plate 50 and the second fixing portion 72 (as shown in FIG. 3).

As a result of making the first fixing portion 74 connected with the hinge 80 by use of a soft material, the present invention has the effect of preventing the first fixing portion 74 and the hinge 80 from being damaged when the door plate 50 is pivotally rotated about the hinge 80 upon the inflation of an air bag.

The hinge 80 includes wrinkles obtained by folding a member between the door plate 50 and the first fixing portion 74 by multiple times. When the door plate 50 is opened, the wrinkles are unfolded, thereby restricting a damage to the first fixing portion 74, hinge 80, and door plate 50.

In the present invention, the door plate 50, hinge 80; and first fixing portion 74 are made of the same soft material as one another. This has the effect of preventing the door plate 50 from being damaged in the course of being pivotally rotated about the hinge 80 upon the inflation of an air bag, or preventing the door plate 50 from excessively damaging the door section 20 of the instrument panel 10.

Accordingly, during the inflation of the air bag, there is no risk that the door section 20 of the instrument panel 10 and the door plate 50 are unexpectedly separated from the instrument panel 10, thus inflicting an injury on the passenger's body.

In the present invention, the chute 70 has first ribs 76 to be fused to the instrument panel 10, and the door plate 50 has second ribs 52 to be fused to the instrument panel 10. Thereby, the door plate 50, which is made of a soft material to restrict a damage thereof, can be fused to the door section 20. Further, since the door plate 50, hinge 80, and first fixing portion 74, which are made of the same soft material as one another, are integrally formed with one another, and the second fixing portion 72 integrally formed with the first fixing portion 74 is fused to the instrument panel 10, it is possible to prevent an excessive damage to the door section 20 and the instrument panel 10 upon the inflation of the air bag.

Hereinafter, the operation of the vehicular air bag door according to the embodiment of the present invention having the above described configuration will be described.

In the manufacture of the air bag door 100, first, the first fixing portion 74 and the second fixing portion 72, which are made of different materials from each other, are integrally formed with each other by a double injection molding in which different materials are sequentially injected into a single mold.

In this case, the first fixing portion 74, hinge 80, and door plate 50, which are made of the same soft material as one another, are preferably made of thermoplastic olefin (TPO), and the second fixing portion 72, which is made of a relatively hard material, is preferably made of polypropylene fiber (PPF).

The air bag door manufactured as described above is installed to a rear surface of the instrument panel 10, i.e. at an inner surface of the door section 20. For this, the first ribs 76 and the second ribs 52 are fused to the instrument panel 10 by welding, to complete the installation of the air bag door 100.

If an air bag is inflated upon a car collision, the door plate 50 is pivotally rotated about the hinge 80 by an inflation pressure of the air bag, thereby allowing the door section 20 to be opened.

In this case, since the door plate 50, hinge 80, and first fixing portion 74 are made of the same soft material as one another, they have no risk of a damage, and can restrict the door section 20 fused to the door plate 50 from being completely separated from the instrument panel 10.

Thereby, the present invention has the effect of preventing the completely separated door section 20 from striking the passenger's body and inflicting an injury on the passenger.

Figure 4:
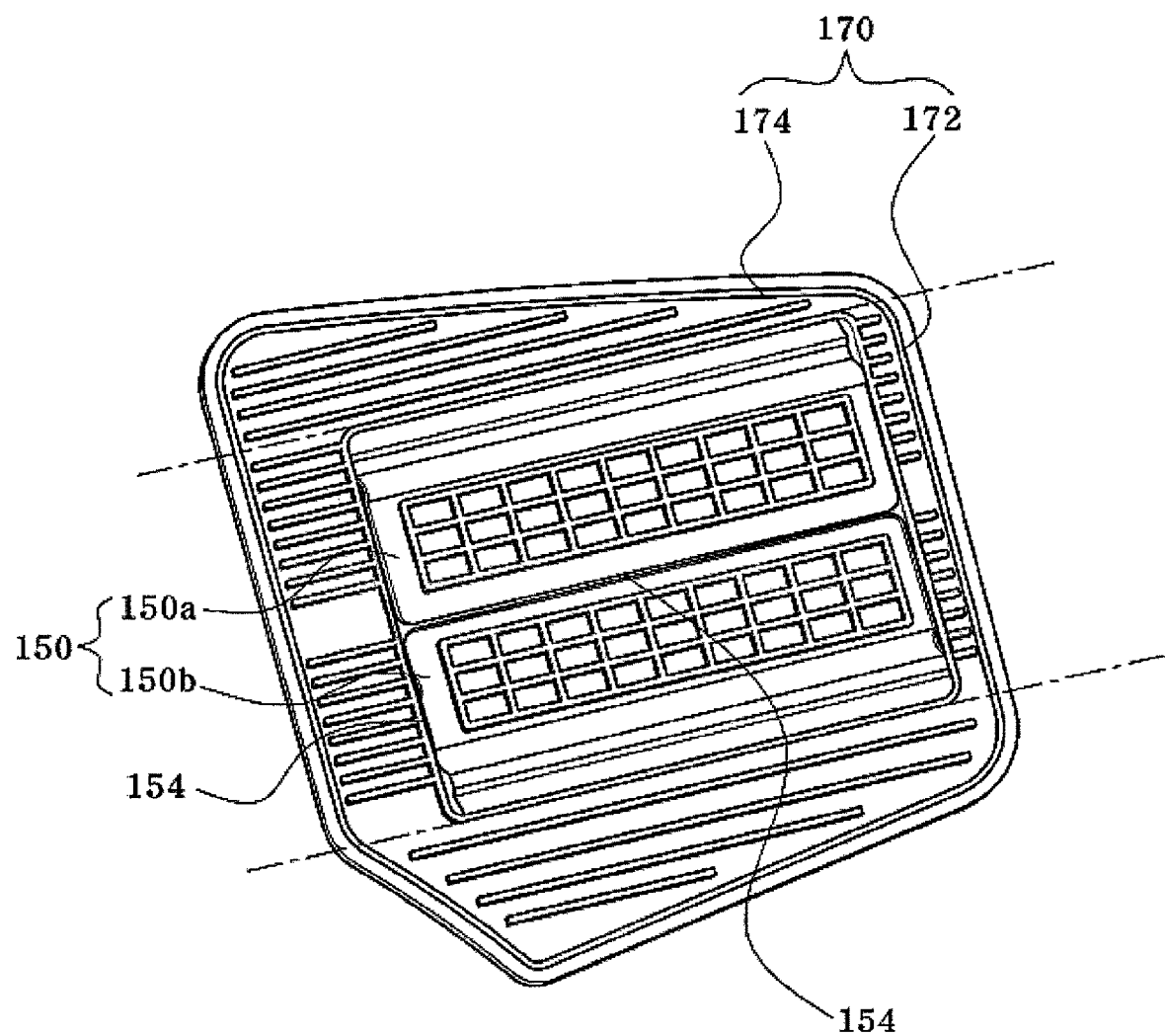
FIG. 4 is a perspective view illustrating a vehicular air bag door according to another embodiment of the present invention.

FIG. 4 is a perspective view illustrating a vehicular air bag door according to another embodiment of the present invention.

Referring to FIG. 4, a door plate 150 included in a vehicular air bag door according to the present embodiment includes a first plate 150*a* provided in a part of an opening defined in a chute 170, and a second plate 150*b* provided in the remaining part of the opening in the chute 170.

With this configuration, the air bag door according to the present embodiment has a "H"-shaped incision 154, and the door plate 150 is pivotally rotated about hinges provided at upper and lower ends thereof to guide the inflation of the air bag.

In the present embodiment, the chute 170 of the air bag door includes a first fixing portion made of a soft material, and a second fixing portion made of a relatively hard material, similar to the above described embodiment. Thus, the chute 170 has the same operation as that of the above described embodiment, and a detailed description thereof will be omitted.

As apparent from the above description, the present invention provides a vehicular air bag door in which a chute, a door plate, and a hinge are integrally formed with one another. With this configuration, the chute, door plate, and hinge can be manufactured by use of a single mold, resulting in a simplified manufacturing process. Further, since the chute, door plate, and hinge have no need for additional hinge and fastening members, the resulting air bag door can achieve a reduction in the number of constituent elements thereof, and consequently, reduced manufacturing time and costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Also, although a vehicular air bag door has been described, it is given only by example, and the present invention can be applied to other various products except for the vehicular air bag door.

Accordingly, the technical protection range of the invention should be determined by the accompanying claims.

What is claimed is:

1. A vehicular air bag door comprising:
   a chute provided at an instrument panel to mount an air bag module thereon, the chute comprising first and second fixing portions coupled with the instrument panel, the first fixing portion being made of a soft material and the second fixing portion being made of a hard material;
   a door plate provided in an opening of the chute and connected with a door section defined in the instrument panel; and
   a hinge provided between the chute and the door plate, wherein the chute, the door plate, and the hinge are integrally formed with one another.

2. The vehicular air bag door according to claim 1, wherein the chute comprises:
- the first fixing portion integrally formed with the hinge; and
- the second fixing portion integrally formed with the first fixing portion.

3. The vehicular air bag door according to claim 2, wherein the hinge includes wrinkles obtained by folding a member between the door plate and the first fixing portion multiple times.

4. The vehicular air bag door according to claim 2, wherein the door plate, the hinge, and the first fixing portion are made of the same soft material as one another.

5. The vehicular air bag door according to claim 1, wherein the chute has first ribs to be fused to the instrument panel.

6. The vehicular air bag door according to claim 5, wherein the door plate has second ribs to be fused to the instrument panel.

7. The vehicular air bag door according to claim 1, wherein the door plate comprises:
- a first plate provided in a part of the opening defined in the chute; and
- a second plate provided in the remaining part of the opening defined in the chute.

8. The vehicular air bag door according to claim 3, wherein the door plate, the hinge, and the first fixing portion are made of the same soft material as one another.

* * * * *